United States Patent [19]

Klein et al.

[11] 4,134,851

[45] Jan. 16, 1979

[54] ALUMINOPHOSPHATE LUMINESCENT GLASS

[75] Inventors: Richard M. Klein, Framingham; William F. Nelson, Weston; Romano G. Pappalardo; Leslie A. Riseberg, both of Sudbury, all of Mass.

[73] Assignee: GTE Laboratories Incorporated, Waltham, Mass.

[21] Appl. No.: 833,976

[22] Filed: Sep. 16, 1977

[51] Int. Cl.$^2$ .............................................. C09K 11/46
[52] U.S. Cl. ........................... 252/301.4 P; 106/47 Q
[58] Field of Search ............... 252/301.4 P; 106/47 R, 106/47 Q

[56] References Cited

U.S. PATENT DOCUMENTS

| 2,306,626 | 12/1942 | Huniger et al. | 252/301.4 R |
| 2,400,147 | 5/1946 | Hooley | 106/47 R X |
| 2,413,940 | 1/1947 | Bickford | 106/47 R X |
| 3,525,698 | 8/1970 | Leto et al. | 252/301.4 P |
| 3,634,282 | 1/1972 | Denis et al. | 252/301.4 P |
| 3,746,556 | 7/1973 | Morgan | 106/47 R |

OTHER PUBLICATIONS

Verstegen et al., "J. of Luminescence" 6, (1973). pp. 425–431.

*Primary Examiner*—Jack Cooper
*Attorney, Agent, or Firm*—David M. Keay

[57] ABSTRACT

A luminescent glass comprising a host material consisting essentially of 25 to 36 mole percent $Al_2O_3$, the balance $P_2O_5$, and which is doped with cerium and terbium. The glass is an efficient emitter of visible radiation, predominantly green, when excited by ultraviolet radiation.

2 Claims, No Drawings

ALUMINOPHOSPHATE LUMINESCENT GLASS

BACKGROUND OF THE INVENTION

This invention concerns a glassy luminescent material which has a high luminous efficiency when excited either by short wavelength UV radiation (as emitted by a low pressure mercury vapor discharge), or by the long UV emission components of a medium or high pressure mercury vapor discharge lamp.

In fluorescent lamps the UV components of the gas discharge are currently converted into visible light in a thin layer of luminescent powders (phosphors) coating the inside surface of the lamp envelope. This layer of fluorescent powder could be eliminated by the use of a luminescent glass-envelope that is efficiently excited by the UV components of the gas discharge in the lamp.

In addition to the simplification in manufacturing that ensues from the use of a luminescent glass as lamp envelope, there is anticipated a reduced level of degradation of the active material responsible for the luminescent process, because of reduced exposure to the energetic plasma of the lamp discharge, and reduced process losses as currently arising from baking of the phosphor coating.

Previous studies of amorphous luminescent materials have concentrated on the following types of glasses: fused silica; simple alkali and alkaline earth silicates, borates and phosphates; and complex silicates. Although fused silica is a reasonable host for many luminescent ions, it has several disadvantages: (a) it can only accommodate small amounts of rare earth dopants (about 500 ppm); (b) even small (about 1 weight percent) additions of transition metal ions such as $Mn^{2+}$ will destabilize fused silica by inducing glass-in-glass immiscibility or phase separation; and (c) fused silica requires extremely high temperatures for envelope fabrication.

Simple amorphous hosts for luminescent ions can be formed by the addition of alkali or alkaline-earth oxides to ternary systems of $SiO_2$, $B_2O_3$ and $P_2O_5$ ($B_2O_3$ and $P_2O_5$ have not been studied individually to any great extent because of their extreme hygroscopicity). Although these glasses have high solubility for luminescent ions and relatively low melting temperatures, they are not commercially useful because of poor chemical resistance or instability with regard to phase separation.

In order to improve the chemical and phase stability, a variety of modifying ions must be added to the simple glass host. Although these ions can stabilize the glass, they also have the adverse effect of greatly increasing the absorption of short UV radiation by the host, resulting in poorer efficiency in producing visible emission.

THE INVENTION

The luminescent material of this invention is an aluminophosphate glass doped with cerium and terbium; it emits predominantly in the green portion of the visible spectrum. The host has a general composition bracketed between about 25 and 36 mole percent $Al_2O_3$ with the balance as $P_2O_5$. Although efficient visible emission can be produced over a fairly wide range of cerium and terbium concentrations, it has been found that the optimum dopant concentrations for maximum efficiency in emission are about 6 to 9 cation percent terbium and less than 1 cation percent cerium.

The aluminophosphate host overcomes many of the disadvantages of the previously cited amorphous materials. First, it is transparent well into the UV; measurements on undoped glasses indicate that the absorption edge is at a wavelength below 190 nm. The aluminophosphates also have a high solubility for rare earths; thus far, up to 11.5 cation percent rare earth has been added with no evidence of destabilization. Another advantage of the aluminophosphate host is its chemical durability; comparative powder tests in hot $H_2O$ show these glasses to compare favorably with commercial soda lime silicate glasses. Compared with fused silica, the aluminophosphates can be melted at low temperatures (about 1500° C.) and have favorable thermal properties, e.g., their expansion coefficients (48–60 $\times$ $10^{-7}$ cm/cm/° C. depending on composition and dopant level) indicate good sealing possibilities with metals such as molybdenum (48 $\times$ $10^{-7}$ cm/cm/° C.) and nickel-iron cobalt alloys such as Rodar (59 $\times$ $10^{-7}$ cm/cm/° C.).

In a specific example, 0.261 grams (0.00152 moles) of $CeO_2$ and 3.34 grams (0.00913 moles) of $Tb_2O_3$ were added, while stirring, to about 300 ml of water heated in a quartz beaker to about 90° C. 17.75 ml of 86% (15.05 molar) $H_3PO_4$, equivalent to 0.267 moles of $H_3PO_4$, were added to the suspension, and 5.91 grams (0.0758 moles) $Al(OH)_3$ were then added. The suspension was gradually evaporated, while stirring, to about a 30 ml residue. The residual suspension was then transferred to an alumina crucible and was fired by heating in accordance with the following schedule: 0.5° C./minute to 200° C.; 1.2° C./minute to 450° C.; 2.2° C./minute to 1000° C. The material was held at 1000° C. for 1½ hours. Next, the material was melted at 1500° C. for one hour, was cast into a desired shape, and was annealed. During the heating process, the $Al(OH)_3$ and $H_3PO_4$ were dehydrated, and some $P_2O_5$ was lost by volatilization. In addition, it is possible to modify the host composition by changing the Al/P ratio and adding modifiers such as $B_2O_3$; $SiO_2$, $ZrO_2$, $Na_2O$, $CdO$, $SnO_2$ and $ZnO$. Other modifying oxides also appear feasible. Finally, the amorphous aluminophosphate host has been activated with other luminescent ions such as $Eu^{3+}$, $Ce^{3+}$ and $Mn^{2+}$, $Sb^{3+}$ and $Mn^{2+}$, $Dy^{3+}$ and $Nd^{3+}$.

The $Ce^{3+}$ and $Tb^{3+}$ doped luminescent glass of this invention exhibits green emission originating from the $^5D_4$ level of $Tb^{3+}$. Trivalent cerium is incorporated into the glass as a sensitizer, in order to absorb short UV radiation strongly, and to transfer this excitation energy to the $Tb^{3+}$ ion.

When the glass is excited by broadband UV, a curve of emission intensity in the visible region of the spectrum shows the green doublet having peaks at about 542 and 548 nm. The emission intensity is about the same over the temperature range of room temperature to 200° C.

On selective excitation at 245 nm the visible emission was found to vary with the sample temperature as follows: at 150° C. the visible emission was 95.7% of the room temperature intensity, while at 250° C. the normalized intensity was 88.8%. The thermal stability of the visible emission opens the possibility of utilizing the glass material in high-load lamps.

The absorbance spectrum of a glass sample 1 mm thick shows that the glass is practically opaque to 254 nm radiation, while it is still transparent to long UV radiation at wavelengths greater than 320 nm.

Brightness measurements for various dopant concentrations were carried out on slices of the material, 1 mm thick and with dimensions of 18 mm × 20 mm. The surfaces of the glass slices were left rough after cutting with a diamond saw. The samples were mounted in light-tight enclosures and excited by long UV (about 365 nm) and short UV (about 254 nm) emitting lamps (Mineralite UVL-15 and UVS-21). The emission from the phosphor was detected with a 1P21 photomultiplier, after traversing a 106 Kodak-Wratten filter. The convolution of the filter transmission and the PMT spectral sensitivity reproduces well the eye spectral sensitivity. Therefore, the PMT current-signal is a measure, on a relative scale, of the glass brigthness. The results for the various samples are listed in Table I.

TABLE I

| Sample No. | Ce Content (Cation %) | Tb Content (Cation %) | Relative Brightness* at 254 nm | 365 nm Excitation |
|---|---|---|---|---|
| 241 | 1 | 2 | 23 | 191 |
| 301 | 2.5 | 6 | 33.7 | 275 |
| 341 | 1 | 6 | 47 | 466 |
| 342 | 4 | 6 | 29 | 137 |
| 343 | 3 | 3 | 21.7 | 150 |
| 344 | 6 | 3 | 20.5 | 120 |
| 345 | 3 | 1 | 9.6 | 60 |
| 346 | 6 | 1 | 6.2 | 40 |
| 541 | 0.5 | 6 | 66 | 680 |
| 542 | 1.0 | 9 | 54.7 | 577 |
| 543 | 0.5 | 9 | 58.3 | 619 |

*Based upon the brightness of the $Ce_{0.66} Tb_{0.33} Mg Al_{11}O_{19}$ phosphor, assigned a brightness of 100.

For excitation at 254 nm the dopant concentrations having optimum brightness are at around 0.5 to 1% Ce and 6 to 9% Tb. They are roughly 60% as bright as the best known Ce-Tb phosphor, namely, $Ce_{0.66} Tb_{0.33} Mg Al_{11}O_{19}$, the relative brightness of which is taken as 100 at both 254 nm and 365 nm. For 365 nm excitation the optimum brightness dopant concentrations are about the same as for 254 nm; the brightness of these compositions is about seven times higher than that of said best-known Ce-Tb phosphor.

What is claimed is:

1. A luminescent glass comprising a host material and a dopant material, wherein the host material consists essentially of between 25 mole percent and 36 mole percent $Al_2O_3$ with the balance $P_2O_5$, and the dopant material consists essentially of between 0.5 and 1 cation percent $Ce^{3+}$ and between 6 and 9 cation percent $Tb^{3+}$, said percentages of $Ce^{3+}$ and $Tb^{3+}$ based on the total cation content of the luminescent glass, whereby the luminescent glass emits visible radiation, predominantly green, when excited by ultraviolet light.

2. The glass of claim 1 wherein said dopant material consists essentially of $Ce^{3+}$ and $Tb^{3+}$ in amounts providing about 0.5 percent and about 6 percent, respectively, of the total cation content of said luminescent glass.

* * * * *